(12) United States Patent
Batur (10) Patent No.: US 8,811,757 B2
(45) Date of Patent: Aug. 19, 2014

(54) MULTI-PASS VIDEO NOISE FILTERING

(71) Applicant: Texas Instruments Incorporated, Dallas, TX (US)

(72) Inventor: Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/734,225

(22) Filed: Jan. 4, 2013

(65) Prior Publication Data

US 2013/0177253 A1 Jul. 11, 2013

Related U.S. Application Data

(60) Provisional application No. 61/583,326, filed on Jan. 5, 2012.

(51) Int. Cl.
*G06K 9/46* (2006.01)
*H04N 7/26* (2006.01)
*G06K 9/40* (2006.01)

(52) U.S. Cl.
CPC ............ *G06K 9/40* (2013.01); *H04N 19/00909* (2013.01); *H04N 19/0089* (2013.01)
USPC ........... 382/236; 382/232; 382/250; 382/251; 382/253; 375/240.27

(58) Field of Classification Search
CPC . H04N 5/213; H04N 5/144; H04N 19/00909; H04N 19/00787; G06K 9/40; G06T 5/002
USPC ......... 382/232, 233, 236, 250, 251, 252, 253, 382/375; 348/607, 620, 407.1, 410.1, 348/415.1, 420.1, 421.1; 375/240.27
See application file for complete search history.

(56) References Cited

U.S. PATENT DOCUMENTS

2009/0074084 A1* 3/2009 Drezner et al. .......... 375/240.29

(Continued)

OTHER PUBLICATIONS

Mukesh C. Motwani et al, "Survey of Image Denoising Techniques", Proceedings of GSPx, Santa Clara, CA, Sep. 27-30, 2004, pp. 1-7.

(Continued)

*Primary Examiner* — Ali Bayat
(74) *Attorney, Agent, or Firm* — Mirna Abyad; Frederick J. Telecky, Jr.

(57) ABSTRACT

A method of noise filtering of a digital video sequence is provided that includes computing a motion image for a frame, wherein the motion image includes a motion value for each pixel in the frame, and wherein the motion values are computed as differences between pixel values in a luminance component of the frame and corresponding pixel values in a luminance component of a reference frame, applying a first spatial noise filter to the motion image to obtain a final motion image, computing a blending factor image for the frame, wherein the blending factor image includes a blending factor for each pixel in the frame, and wherein the blending factors are computed based on corresponding motion values in the final motion image, generating a filtered frame, wherein the blending factors are applied to corresponding pixel values in the reference frame and the frame, and outputting the filtered frame.

16 Claims, 4 Drawing Sheets

(56) References Cited

U.S. PATENT DOCUMENTS

| | | |
|---|---|---|
| 2009/0153739 A1 | 6/2009 | Hong |
| 2009/0273716 A1 | 11/2009 | Wu |
| 2010/0166300 A1* | 7/2010 | Spampinato et al. .......... 382/162 |
| 2011/0075042 A1* | 3/2011 | Wang et al. ................... 348/669 |
| 2011/0242422 A1 | 10/2011 | Hong et al. |
| 2012/0019727 A1* | 1/2012 | Zhai et al. .................... 348/607 |
| 2013/0113884 A1* | 5/2013 | Leontaris et al. ............... 348/43 |

OTHER PUBLICATIONS

Bahadir K. Gunturk et al, "Demosaiking: Color Filter Array Interpolation", Signal Processing Magazine, IEEE, vol. 22, Issue 1, Jan. 2005, pp. 44-45.

Aziz Omit Batur, "Digital Camera and Method", U.S. Appl. No. 11/677,846, filed Feb. 22, 2007, pp. 1-22.

* cited by examiner

MULTI-PASS VIDEO NOISE FILTERING

CROSS-REFERENCE TO RELATED APPLICATIONS

This application claims benefit of U.S. Provisional Patent Application Ser. No. 61/583,326 filed Jan. 5, 2012, which is incorporated herein by reference in its entirety.

BACKGROUND OF THE INVENTION

1. Field of the Invention

Embodiments of the present invention generally relate to video noise filtering.

2. Description of the Related Art

Video noise filters have become important differentiators for consumer video products because noise level is one of the key factors of video quality. Videos captured by imaging sensors (e.g., cell phone cameras, video cameras) or received from analog video inputs (e.g., TV cable, DVD/VCR) are often contaminated by significant amounts of random noise. Video noise filters can improve visual quality, coding efficiency, and facilitate further processing and analysis such as enhancement, object tracking, and recognition. Further, video noise filters can be applied in many applications such as cell phone camera, video surveillance, DVR, etc.

In many applications, a video noise filter includes both a spatial noise filter (SNF) and a temporal noise filter (TNF). In general, temporal noise filtering is more effective than spatial noise filtering for video noise filtering because temporal noise filtering utilizes information from multiple frames. One of the more commonly used TNFs is a temporal infinite impulse response (IIR) filter which has very low computational complexity and utilizes information from all previous frames. However, use of a temporal IIR noise filter on a video sequence may result in ghosting artifacts leading to sticky contours in moving areas of the video sequence, especially at high filter strengths. A sticky contour occurs if an object in a video sequence is moving and the contours, i.e., edges, of the object in a former position remain visible when the object has moved. For example, if a box is moving from left to right, the sticky contours may be visible as a lot of vertical lines to the left of the moving box. These visible contours may be referred to as ghosting artifacts. A motion adaptive temporal IIR noise filter can reduce the ghosting artifacts by automatically adjusting filter strength according to the motion amplitude of the video sequence. However, even with such automatic adjustment, some ghosting artifacts do not fade away with time. Accordingly, improvements in temporal noise filtering are desirable.

SUMMARY

Embodiments of the invention relate to methods and apparatus for noise filtering of digital video sequences. In one aspect, a method of noise filtering of a digital video sequence is provided that includes receiving a frame of the digital video sequence and a reference frame corresponding to the frame, computing a motion image for the frame, wherein the motion image includes a motion value for each pixel in the frame, and wherein the motion values are computed as differences between pixel values in a luminance component of the frame and corresponding pixel values in a luminance component of the reference frame, applying a first spatial noise filter to the motion image to obtain a final motion image, computing a blending factor image for the frame, wherein the blending factor image includes a blending factor for each pixel in the frame, and wherein the blending factors are computed based on corresponding motion values in the final motion image, generating a filtered frame, wherein the blending factors are applied to corresponding pixel values in the reference frame and the frame, and outputting the filtered frame.

In one aspect, a digital system configured to filter a digital video sequence is provided that includes means for receiving a frame of the digital video sequence and a reference frame corresponding to the frame, means for computing a motion image for the frame, wherein the motion image includes a motion value for each pixel in the frame, and wherein the motion values are computed as differences between pixel values in a luminance component of the frame and corresponding pixel values in a luminance component of the reference frame, means for applying a first spatial noise filter to the motion image to obtain a final motion image, means for computing a blending factor image for the frame, wherein the blending factor image includes a blending factor for each pixel in the frame, and wherein the blending factors are computed based on corresponding motion values in the final motion image, and means for generating a filtered frame, wherein the blending factors are applied to corresponding pixel values in the reference frame and the frame.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

In general, embodiments of the invention provide methods and systems for noise filtering of a digital video sequence. More specifically, embodiments provide video noise filtering in which a motion adaptive temporal noise filter includes multi-pass application of a spatial filter on temporal differences. Applying a spatial noise filter in a multi-pass fashion in the temporal filter provides increased robustness to ghosting artifacts. Further, this filtering technique is computationally simple to implement. In some embodiments, this multi-pass approach effectively implements a temporal noise filter with a large kernel by using a filter with a small kernel.

Figure 1:
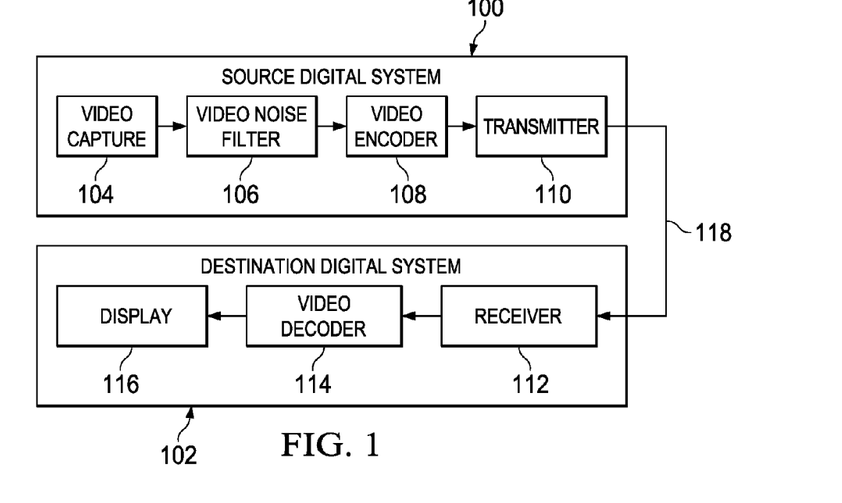
FIG. 1 is a block diagram of a digital system.

FIG. 1 shows a block diagram of a digital system configured to perform noise filtering on digital video sequences. The system includes a source digital system 100 that transmits encoded video sequences to a destination digital system 102 via a communication channel 118. The source digital system 100 includes a video capture component 104, a video noise filter component 106, a video encoder component 108 and a transmitter component 110. The video capture component 104 is configured to provide a video sequence to be filtered by the video noise filter component 106 prior to encoding by the video encoder component 108. The video capture component 104 may be, for example, an imaging sensor, a video camera, a video archive, or a video feed from a video content provider. In some embodiments, the video capture component 104 may generate computer graphics as the video sequence, or a combination of live video and computer-generated video.

The video noise filter component 106 receives a video sequence from the video capture component 104 and performs noise filtering as described herein on the frames of the video sequence to generate a noise filtered video sequence. In some embodiments, the video noise filter component 106 may include functionality/components as described in reference to FIG. 2 below.

The video encoder component 108 receives a noise filtered video sequence from the video noise filter component 106 and encodes it for transmission by the transmitter component 110. In general, the video encoder component 108 receives the noise filtered video sequence from the video capture component 104 via the video noise filter component 106 as a sequence of frames, divides the frames into coding units which may be a whole frame or a part of a frame, divides the coding units into blocks of pixels, and encodes the video data in the coding units based on these blocks.

The transmitter component 110 transmits the encoded video data to the destination digital system 102 via the communication channel 118. The communication channel 118 may be any communication medium, or combination of communication media suitable for transmission of the encoded video sequence, such as, for example, wired or wireless communication media, a local area network, or a wide area network.

The destination digital system 102 includes a receiver component 112, a video decoder component 114 and a display component 116. The receiver component 112 receives the encoded video data from the source digital system 100 via the communication channel 118 and provides the encoded video data to the video decoder component 114 for decoding. In general, the video decoder component 114 reverses the encoding process performed by the video encoder component 108 to reconstruct the frames of the video sequence. The reconstructed video sequence may then be displayed on the display component 116. The display component 116 may be any suitable display device such as, for example, a plasma display, a liquid crystal display (LCD), a light emitting diode (LED) display, etc.

In some embodiments, the source digital system 100 may also include a receiver component and a video decoder component and/or the destination digital system 102 may include a transmitter component and a video encoder component for transmission of video sequences in both directions for video streaming, video broadcasting, and video telephony. Further, the video encoder component 108 and the video decoder component 114 may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the next-generation video coding standard referred to as High Efficiency Video Coding (HEVC) under development by the Joint Collaborative Team on Video Coding (JCT-VC) of ITU-T WP3/16 and ISO/IEC JTC 1/SC 29/WG 11, etc. The video noise filter component 106, the video encoder component 108 and the video decoder component 114 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
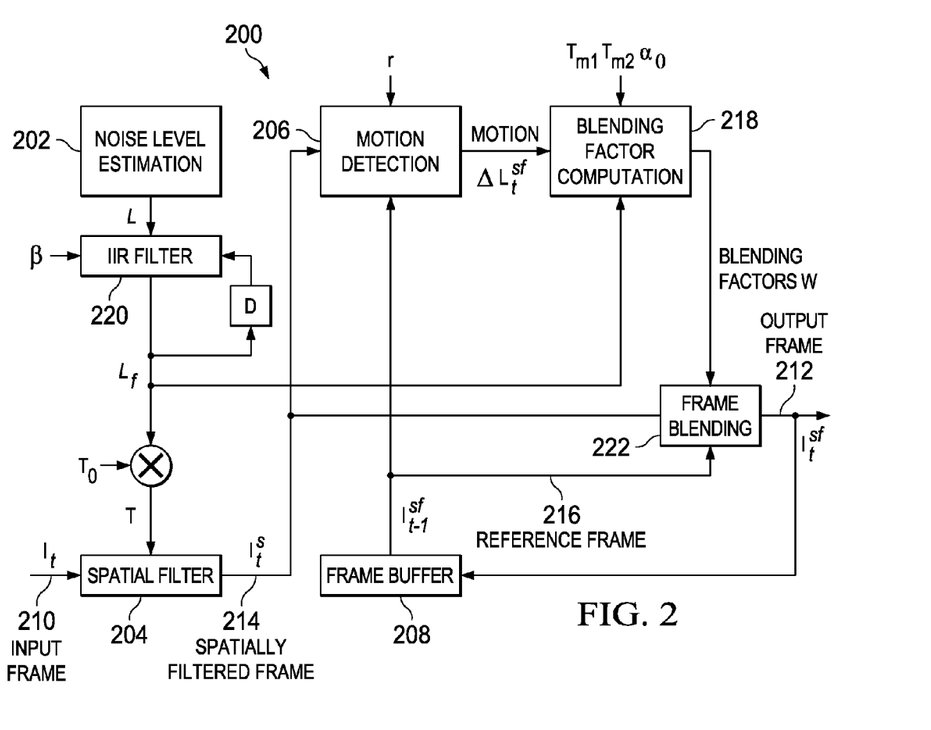
FIG. 2 is a block diagram of a noise filter.

FIG. 2 shows a block diagram of a noise filter 200, e.g., the video noise filter component 106 of FIG. 1. The noise filter 200 is configured to perform both spatial and temporal noise filtering on frames of a video sequence. The pixel values in the input frames and the filtered output frames are integer values. The temporal filtration includes multi-pass application of the spatial filter on temporal differences as described in more detail herein. As shown in FIG. 2, the noise filter 200 includes a noise level estimation component 202, an infinite impulse response (IIR) filter component 220, a spatial filter component 204, and components for temporal filtration, i.e., a motion detection component 206, a blending factor computation component 218, a frame blending component 222, and a frame buffer 208.

Further, $T_0$, $\beta$, $T_{m1}$, $T_{m2}$, r, and $a_0$ are input parameters of the noise filter 200. $T_0$ is a parameter of the spatial filter component 204 that controls the strength of the spatial noise filter. A larger $T_0$ value produces smoother results while a smaller value retains more detail. $\beta$ is a parameter of the IIR filter 220 that controls how fast the noise level changes from frame-to-frame. $T_{m1}$, $T_{m2}$, r, and $a_0$ are input parameters for temporal filtration. The values of $T_{m1}$ and $T_{m2}$ are motion thresholds used to control the strength of the temporal noise filter. Flat areas in frames, i.e., areas without texture, look smoother for higher threshold values but the higher values may cause more ghosting artifacts on moving areas. The value of $a_0$ is also used to control the strength of the temporal noise filter. The value may range between 0 and 1 where the filter is stronger when $a_0$ is close to 1 and weaker when $a_0$ is close to 0. The value of r is a subsampling ratio used by the motion detection component 206.

The noise level estimation component 202 estimates the level of noise in the input frame. The noise estimation is performed for each color channel, e.g., YUV or YCbCr, of the input frame and may be performed on the input frame block-by-block or line-by-line. Noise level estimation may be performed using any suitable noise estimation technique. Some suitable techniques are described in U.S. Patent Application Publication No. 2009/0153739, filed on Dec. 12, 2008, which is incorporated by reference herein.

The IIR filter component 220 applies a low-pass IIR filter to the output of the noise level estimation component 202 to control the speed of change in noise level L by generating a filtered noise level $L_f$. The low-pass IIR filter is applied to the noise level for each color channel. The filtered noise levels $L_f$ are then provided as an input to the blending factor computation component 218. Further, the filtered noise levels $L_f$ are scaled using $T_0$ to generate an input strength parameter for the spatial filter component 204.

The spatial filter component 204 performs spatial filtration on each color channel, e.g., YUV or YCbCr, of the input frame 210 to generate a spatially filtered frame 214. The spatial filtration may be applied block-by-block or line-by-line. Let $I_t$ denote the current video frame 210 at time t and let $I_t^s$ denote the spatially filtered frame 214. The spatially filtered frame 214 is provided as an input to the motion detection component 206 and the frame blending component 222. Spatial filtration may be performed using any suitable spatial filtration technique, e.g., a wavelet based or bilateral noise filter, with a kernel size of N×N pixels. Any suitable value of N may be used. While the value of N should be as large as possible to achieve good noise filtering, in practice very large filter kernels are computationally complex to implement. Accordingly, the value of N may be selected such that good noise reduction is achieved with a reasonable implementation cost. In some embodiments, the value of N is 15. In some embodiments, the value of N is an empirically determined constant. In some embodiments, the value of N is supplied by a user. One suitable spatial filtration technique is described in U.S. Patent Application Publication No. 2009/0153739. Another suitable spatial filtration technique is described in U.S. patent application Ser. No. 11/677,846, filed Feb. 22, 2007. Examples of other suitable spatial filtration techniques are described in M. C. Motwani, et al., "Survey of Image Denoising Techniques," Proceedings of Global Signal Processing Expo and Conference (GSPx '04), Santa Clara, Calif., September 2004.

The frame buffer 208 stores the previous output frames 212 of the noise filter 200. These output frames are used as reference frames by the motion detection component 206 and the frame blending component 222.

The motion detection component 206 computes the motion between a reference frame 216 from the frame buffer 208 and the spatially filtered frame 214. More specifically, the motion detection component 206 computes a motion value for each pixel. The output of the motion detection component 206 is a motion image $\Delta L_t^{sf}$ containing a motion value for each pixel. In one or more embodiments, the reference frame is a filtered frame produced by application of the noise filter 200 to the frame immediately preceding the input frame 210 in a video sequence. Methods for computing the motion values are described below in reference to FIGS. 4A and 4B.

Figure 3:
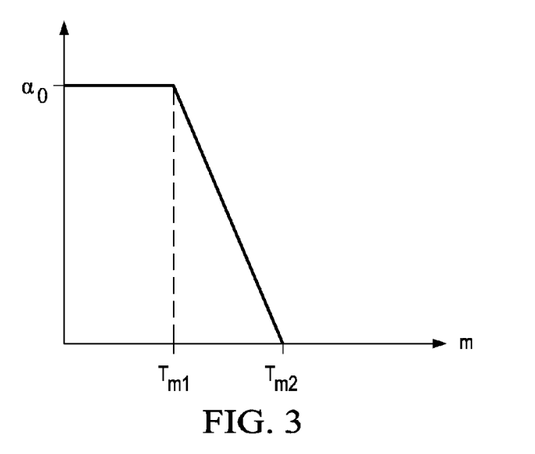
FIG. 3 is an example of a motion-to-blending factor function.

The motion-to-blending factor conversion component 218 computes a blending factor (also referred to as a weight) for each pixel based on the motion value for that pixel computed by the motion detection component 206. More specifically, a blending factor for a pixel is computed as a function of $a_0$, $T_{m1}$, $T_{m2}$, and the motion value for that pixel. The blending factor for a pixel at location x,y is a function of the motion m at that pixel location and may be expressed as a piecewise linear function. FIG. 3 shows an example of one such function. In FIG. 3, $a_0$ is the maximum possible blending factor, which is achieved when the motion m is smaller than $T_{m1}$. The value of $a_0$ may be any suitable number between 0 and 1. Large values of $a_0$ provide stronger temporal noise filtering but may also generate ghosting artifacts. $T_{m1}$ and $T_{m2}$ are tuning thresholds which determine the strength of the temporal filter. Larger values for these thresholds provide stronger noise filtering but may reduce the quality of the filtered frames. In some embodiments, the values of $a_0$, $T_{m1}$, and $T_{m2}$ are empirically determined constants. In some embodiments, the values of $a_0$, $T_{m1}$, and $T_{m2}$ are set by a user. In some embodiments, $a_0$=0.8, $T_{m1}$=8, and $T_{m2}$=14. In some embodiments, the values of $T_{m1}$ and $T_{m2}$ may be a function of the noise level estimate $L_f$, where larger values of $L_f$ result in larger values of $T_{m1}$ and $T_{m2}$.

The motion-to-blending factor conversion function may be implemented as a lookup table that is updated for each frame, thus requiring no additional computation for each pixel. FIG. 3A shows an example of one such function. Pseudo code illustrating creation of the lookup table for a frame using the linear function of FIG. 3 is shown in Table 1.

TABLE 1

```
for m = 0 to maximum motion (255*2 for 8-bit images)
    if (m < T_{m1})
        a[m] = a_0;
    else
        if (m>=T_{m1})&(m< T_{m2})
```

TABLE 1-continued

```
        a[m] = a_0 - a_0 (m- T_{m1})/( T_{m2}- T_{m1});
    else
        a[m] = 0;
    end if
end for
```

The output of the blending factor computation component 218 is an image W containing a blending factor for each pixel. Given a look up table, the blending factor computation component 218 may determine the blending factor for each pixel with a simple table look up using the absolute value of the motion value computed for the pixel by the motion detection component 206. That is, the image W may be determined as per W=LUT(abs($\Delta L_t^{sf}$)) where LUT is the look up table and abs( ) is the absolute value.

The frame blending component 222 generates the filtered output frame 212 using the blending factors computed by the blending factor computation component 218, the reference frame from the frame buffer 208, and the spatially filtered frame 214. More specifically, the frame blending component 222 applies the temporal noise filtering to the spatially filtered input frame 214 according to the following equation: $I_t^{sf}=I_t^s-W(I_t^s-I_{t-1}^{sf})$, where $I_{t-1}^{sf}$ is the reference frame. This equation is applied to each pixel with the corresponding blending factor from the blending factor image W. Further, the equation is applied to each color channel, e.g., YUV or YCbCr, of the spatially filtered frame 214.

Figure 4A:
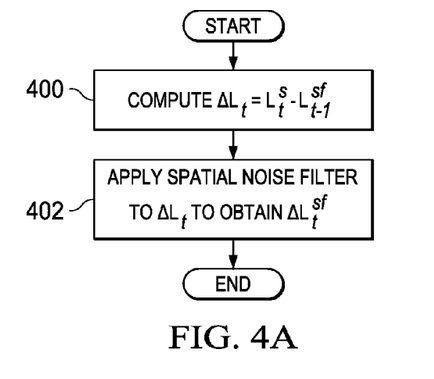
FIGS. 4A, 4B, and 5 are flow graphs of methods.

FIG. 4A is a flow graph of a method for determining motion in the temporal noise filter of a noise filter such as the noise filter 200 of FIG. 2. This method may be performed by the motion detection component 206. The method generates the motion image $\Delta L_t^{sf}$ containing a motion value for each pixel of the spatially filtered frame $I_t^s$.

The method begins with the computation 400 of the temporal luma differences for each pixel between the luminance component $L_t^s$ of the spatially filtered frame $I_t^s$ and the luminance component $L_{t-1}^{sf}$ of the reference frame $I_{t-1}^{sf}$, i.e., $\Delta L_t = L_t^s - L_{t-1}^{sf}$ is computed where $\Delta L_t$ is the initial motion image. Note that for the first frame in a video sequence t=0 and there is no previous frame. For the first frame, $\Delta L_t$=0.

Although not specifically shown in FIG. 4A, in some embodiments, the motion image $\Delta L_t$ is downsampled to reduce computational complexity. Any suitable downsampling ratio may be used, e.g., a ratio of 2 or 4.

A spatial noise filter with a kernel of size of N×N is then applied 402 to the motion image $\Delta L_t$ to obtain a final motion image $\Delta L_t^{sf}$. In some embodiments, the application of the spatial noise filter is performed as per the method of FIG. 4B to reduce computational complexity and to approximate the application of a spatial filter with a larger kernel size to the original motion image. Any suitable spatial filter and value of N may be used. Examples of suitable filters and kernel sizes are previously described herein. In some embodiments, the kernel size of this spatial noise filter differs from that of the spatial noise filter applied to generate the spatially filtered frame $I_t^s$. In some embodiments, the same spatial filter used to generate the spatially filtered frame $I_t^s$ is applied to the motion image $\Delta L_t$ to obtain the final motion image $\Delta L_t^{sf}$. In embodiments in which the original motion image $\Delta L_t$ is downsampled, $\Delta L_t^{sf}$ is upsampled to the original resolution of $\Delta L_t$.

Figure 4B:
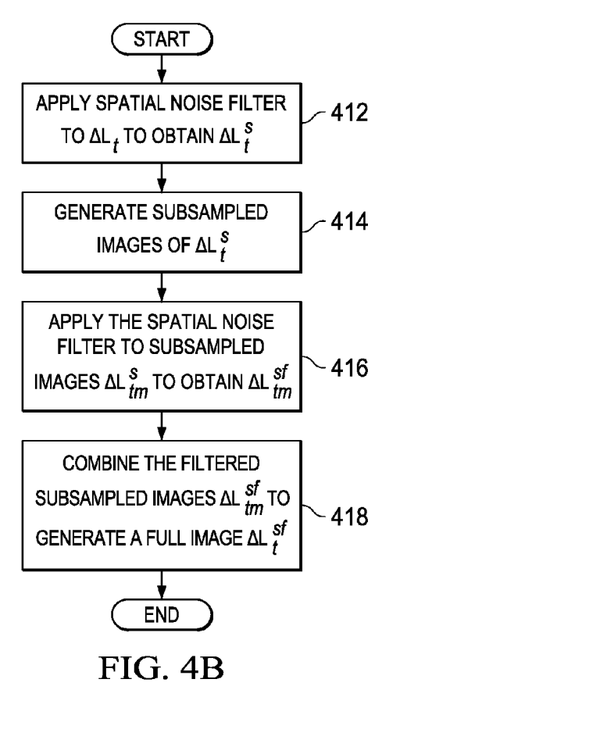

FIG. 4B is a flow graph of a method for applying the spatial noise filter to a motion image $\Delta L_t$ to obtain a final motion image $\Delta L_t^{sf}$. Initially, the spatial noise filter is applied 412 to the motion image $\Delta L_t$ to obtain a spatially filtered motion image $\Delta L_t^s$. The spatially filtered motion image $\Delta L_t^s$ is then subsampled 414 to generate M subsampled images $\Delta L_{tm}^s$, where m=0 . . . M. The number M of subsampled images depends on the subsampling ratio r used, i.e., $M=r^2$. Any suitable subsampling ratio may be used, e.g., r=2 or r=4. In general, the value of the subsampling ratio may be chosen based on implementation complexity and visual quality of the filtered frames. In some embodiments, the value of the subsampling ratio r is an empirically determined constant. In some embodiments, the value of the subsampling ratio r is supplied by a user. For a given subsampling ratio r, the $M=r^2$ subsampled images may be generated as follows. Let k and x be integer offsets where k=0, . . . , r−1 and x=0, . . . r−1. The subsampled image defined by these offsets includes the following pixels from the image $\Delta L_t^s$: $\Delta L_t^s(i,j)$ where i=k, k+r, k+2r, . . . , k+vertSize-r and j=x, x+r, x+2r, . . . , x+horzSize-r, $\Delta L_t^s(i,j)$ denotes the pixel in the ith row and jth column, horzSize is the horizontal size of the $\Delta L_t^s$ image and vertSize is the vertical size of the $\Delta L_t^s$ image.

For example, for a subsampling ratio of 4, 16 subsampled versions of the spatially filtered motion image $\Delta L_t^s$ are generated by selecting pixel subsets of the image. For example, for the first subsampled image, the pixels with horizontal indices i=0, 4, 8, . . . , horzSize-3 and vertical indices j=0, 4, 8, . . . , vertSize-3 are selected. For the second subsampled image, the pixels with horizontal indices i=1, 5, 9, . . . , horzSize-2 and vertical indices j=0, 4, 8, . . . , vertSize-3 are selected. The remaining subsampled images are similarly generated.

The spatial noise filter used to generate the spatially filtered motion image $\Delta L_t^s$ is then applied 416 to each of the M subsampled images $\Delta L_{tm}^s$ to obtain M spatially filtered subsampled images $\Delta L_{tm}^{sf}$. Note that applying the spatial filter to the M subsampled images approximates the application of a spatial filter with a larger kernel size to the original motion image.

The M spatially filtered subsampled images $\Delta L_{tm}^{sf}$ are then combined 418 to generate a full motion image $\Delta L_t^{sf}$. That is, the subsampling of step 414 is reversed to generate the final motion image $\Delta L_t^{sf}$.

Figure 5:
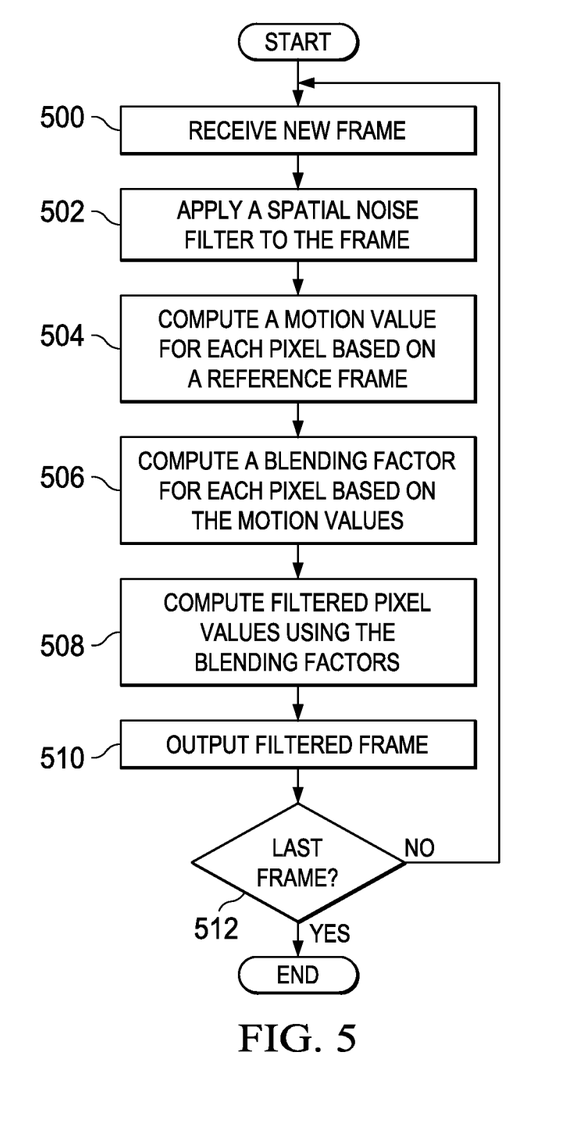

FIG. 5 is a flow graph of a method for noise filtering of frames in a video sequence. The frames may be a Bayer (RGB) frames, i.e., video frames that have not yet been processed by an image pipeline or YCbCr (YUV) frames, i.e., video frames that have been processed by an image pipeline. Initially, a frame $I_t$ of the video sequence is received 500. A spatial noise filter is applied 502 to the frame $I_t$ to generate a spatially filtered frame $I_t^s$. If $I_t$ is a Bayer frame, the spatial noise filter is applied to each color component. If $I_t$ is a YCbCr frame, the spatial noise filter is applied to each of the Y, Cb, and Cr components. Any suitable spatial filter may be used and filter kernel size may be used. Examples of suitable spatial filters and kernel sizes are previously described herein.

A motion value is computed 504 for each pixel based on a reference frame, i.e., a motion image $\Delta L_t^{sf}$ containing a motion value for each pixel is computed. The methods of FIG. 4A or the method of FIGS. 4A and 4B may be used to compute the motion image $\Delta L_t^{sf}$. Note that if $I_t$ is a YCbCr frame, the luminance components $L_t^s$ and $L_{t-1}^{sf}$ are readily available. If $I_t$ is a Bayer frame, these luminance components are respectively computed from the Bayer frame and the reference Bayer frame. Any suitable technique for computing the luminance components may be used. For example, color filter array (CFA) interpolation (also referred to as demosaicking) may be performed on the Bayer frame followed by RGB to YCbCr conversion. Examples of suitable techniques for CFA interpolation may be found in B. K. Gunturk, et al., "Demosaicking: Color Filter Array Interpolation," Signal Processing Magazine, IEEE, Vol. 22, Issue 1, January 2005, pp. 44-54.

A blending factor is then computed 506 for each pixel based on the motion values, i.e., a blending factor image W is computed that contains a blending factor for each pixel. Computation of blending factors is previously described herein.

Filtered pixel values are then computed 508 using the blending factors. More specifically, temporal noise filtering is applied to the spatially filtered input frame $I_t^s$ according to the following equation: $I_t^{sf}=I_t^s-W(I_t^s-I_{t-1}^{sf})$, where $I_t^{sf}$ i is the reference frame. If $I_t^s$ is a YCbCr frame, this equation is applied to each of the Y, Cb, and Cr components. If $I_t^s$ is a Bayer frame, this equation is applied to each color component.

The resulting filtered frame $I_t^{sf}$ is then output 510 and stored for use as a reference frame. If the last frame in the video sequence has been processed 512, the method ends. Otherwise, the next frame is processed.

Figure 6:
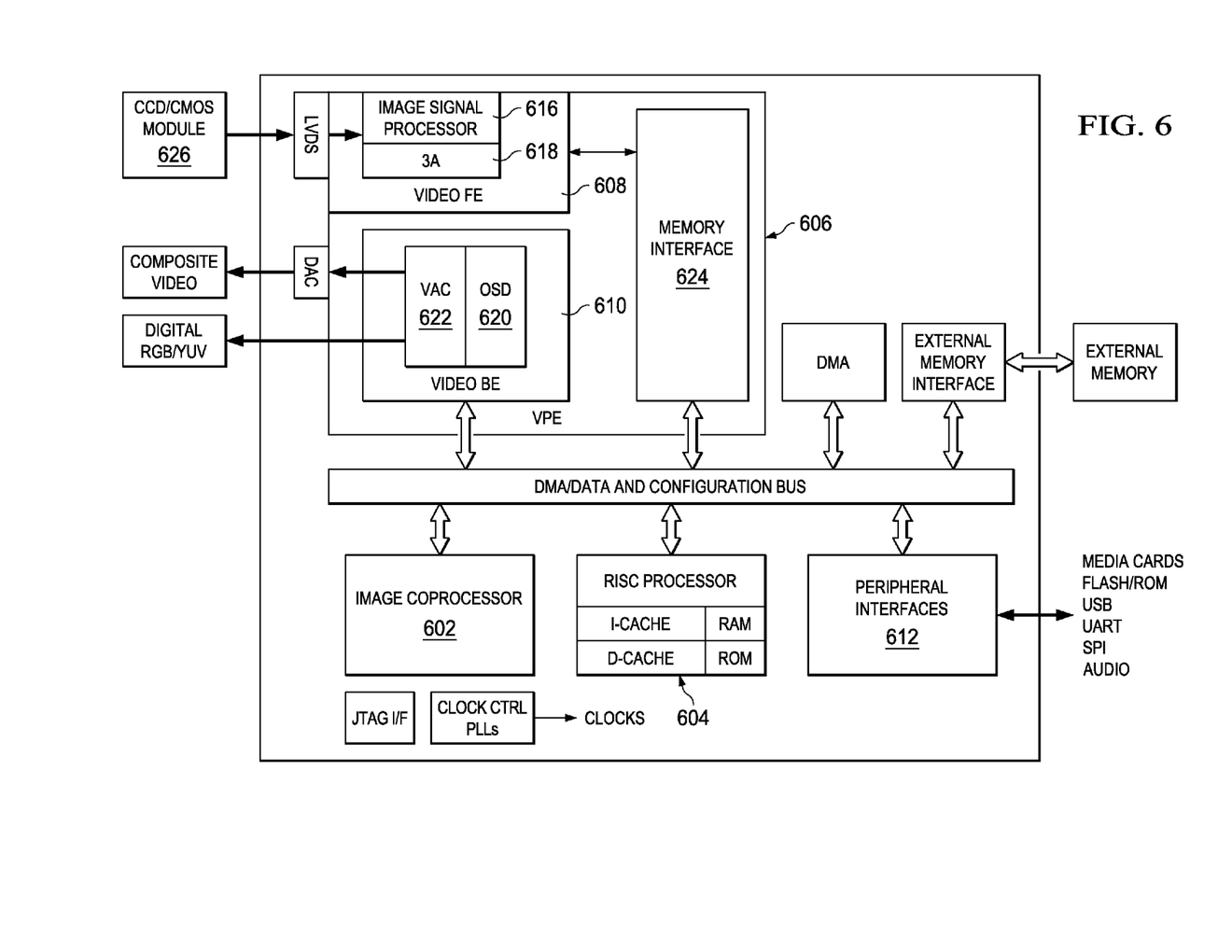
FIG. 6 is a block diagram of an illustrative digital system.

Embodiments of the methods and systems described herein may be implemented for virtually any type of digital system (e.g., a desk top computer, a laptop computer, a handheld device such as a mobile (i.e., cellular) phone, a personal digital assistant, a digital camera, a digital video recorder, etc.) with functionality to capture or otherwise generate digital video sequences or to display digital video sequences. FIG. 6 is an example of one such digital system.

FIG. 6 shows a digital system suitable for an embedded system (e.g., a digital camera) that includes, among other components, a DSP-based image coprocessor (ICP) 602, a RISC processor 604, and a video processing engine (VPE) 606 that may be configured to perform noise filtering as described herein. The RISC processor 604 may be any suitably configured RISC processor. The VPE 606 includes a configurable video processing front-end (Video FE) 608 input interface used for video capture from imaging peripherals such as image sensors, video decoders, etc., a configurable video processing back-end (Video BE) 610 output interface used for display devices such as SDTV displays, digital LCD panels, HDTV video encoders, etc, and memory interface 624 shared by the Video FE 608 and the Video BE 610. The digital system also includes peripheral interfaces 612 for various peripherals that may include a multi-media card, an audio serial port, a Universal Serial Bus (USB) controller, a serial port interface, etc.

The Video FE 608 includes an image signal processor (ISP) 616, and a 3A statistic generator 5A) 618. The ISP 616 provides an interface to image sensors and digital video sources. More specifically, the ISP 616 may accept raw image/video data from a sensor module 626 (e.g., CMOS or CCD) and can accept YUV video data in numerous formats. The ISP 616 also includes a parameterized image processing module with functionality to generate image data in a color format (e.g., RGB) from raw CCD/CMOS data. The ISP 616 is customizable for each sensor type and supports video frame rates for preview displays of captured digital images and for video recording modes. The ISP 616 also includes, among other functionality, an image resizer, statistics collection functionality, and a boundary signal calculator. The 3A module 618 includes functionality to support control loops for auto focus, auto white balance, and auto exposure by collecting metrics on the raw image data from the ISP 616 or external memory. In one or more embodiments of the invention, the Video FE 608 is configured to perform noise filtering as described herein.

The Video BE 610 includes an on-screen display engine (OSD) 620 and a video analog encoder (VAC) 622. The OSD engine 620 includes functionality to manage display data in various formats for several different types of hardware display windows and it also handles gathering and blending of video data and display/bitmap data into a single display window before providing the data to the VAC 622 in a color space format (e.g., RGB, YUV, YCbCr). The VAC 622 includes functionality to take the display frame from the OSD engine 620 and format it into the desired output format and output signals required to interface to display devices. The VAC 622 may interface to composite NTSC/PAL video devices, S-Video devices, digital LCD devices, high-definition video encoders, DVI/HDMI devices, etc.

The memory interface 624 functions as the primary source and sink to modules in the Video FE 608 and the Video BE 610 that are requesting and/or transferring data to/from external memory. The memory interface 624 includes read and write buffers and arbitration logic.

The ICP 602 includes functionality to perform the computational operations required for compression and other processing of captured images. The video compression standards supported may include, for example, one or more of the JPEG standards, the MPEG standards, the H.26x standards, and the emerging HEVC standard. In one or more embodiments, the ICP 602 may be configured to perform computational operations of noise filtering as described herein.

In operation, to capture a photograph or video sequence, video signals are received by the video FE 608 and converted to the input format needed to perform video compression. Prior to the compression, noise filtering as described herein may be applied as part of processing the captured video data. The video data generated by the video FE 608 is stored in the external memory. The video data is then encoded, i.e., compressed. During the compression process, the video data is read from the external memory and the compression computations on this video data are performed by the ICP 602. The resulting compressed video data is stored in the external memory. The compressed video data is then read from the external memory, decoded, and post-processed by the video BE 610 to display the image/video sequence.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein assuming a spatial filter with a square kernel. One of ordinary skill in the art will understand embodiments in which a spatial filter with an M×N kernel, M≠N, is used. Any suitable values of M and N may be used.

In another example, although FIG. 1 illustrates noise filtering prior to encoding a video sequence, one of ordinary skill in the art will understand embodiments in which such noise filtering is used in other places. For example, noise filtering as described herein may be applied after decoding an encoded video sequence, e.g., between the video decoder 114 and the display 116 of FIG. 1. As another example, in a digital system that includes a DVD player, a noise filter as described herein may be applied after the video on the DVD is decoded and before it is displayed on the television or computer screen.

In another example, embodiments have been described here assuming a motion to blending factor conversion function with two thresholds. One of ordinary skill in the art will understand embodiments in which other suitable functions with more or fewer parameters are used such as those described in U.S. Patent Application Publication No. 2009/0153739.

In another example, embodiments have been described in the context of a noise filter 200 (FIG. 2) that includes both a spatial filtering component 204 and temporal filtering components 206, 208, 218, and 212 or a noise filtering method (FIG. 5) that includes a step 502 of applying a spatial filter to the input frame. One of ordinary skill in the art will understand embodiments in which the noise filter does not include a spatial filtering component. One of ordinary skill in the art will also understand method embodiments that do not include applying a spatial filter to the input frame.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method of noise filtering of a digital video sequence, the method comprising:
receiving a frame of the digital video sequence and a reference frame corresponding to the frame;
computing a motion image for the frame, wherein the motion image comprises a motion value for each pixel in the frame, and wherein the motion values are computed as differences between pixel values in a luminance component of the frame and corresponding pixel values in a luminance component of the reference frame;
applying a first spatial noise filter to the motion image to obtain a final motion image, comprising:
  applying the first spatial noise filter to the motion image to obtain a spatially filtered motion image;
  subsampling the spatially filtered motion image by a sampling ratio $r^2$, wherein r is the subsampled ration, and wherein applying the first spatial noise filter to each of the subsampled images to obtain $r^2$ spatially filtered subsampled images; and
  combining the $r^2$ spatially filtered subsampled images by reversing the subsampling to obtain the final motion image;

computing a blending factor image for the frame, wherein the blending factor image comprises a blending factor for each pixel in the frame, and wherein the blending factors are computed based on corresponding motion values in the final motion image;

generating a filtered frame, wherein the blending factors are applied to corresponding pixel values in the reference frame and the frame; and outputting the filtered frame.

2. The method of claim 1, wherein a value of the ratio r is one selected from a group consisting of 2 and 4.

3. The method of claim 1, further comprising:
applying a spatial noise filter to the frame prior to the computing a motion image.

4. The method of claim 3, wherein the first spatial noise filter and the spatial noise filter are a same spatial noise filter.

5. The method of claim 1, further comprising:
downsampling the motion image prior to the applying a first spatial noise filter; and
upsampling the final motion image by reversing the downsampling.

6. The method of claim 1, wherein the first spatial noise filter is an N×N spatial noise filter, wherein N is an integer.

7. The method of claim 6, wherein N=15.

8. The method of claim 1, wherein the frame is a Bayer frame.

9. A digital system configured to filter a digital video sequence, the digital system comprising:
means for receiving a frame of the digital video sequence and a reference frame corresponding to the frame;
means for computing a motion image for the frame, wherein the motion image comprises a motion value for each pixel in the frame, and wherein the motion values are computed as differences between pixel values in a luminance component of the frame and corresponding pixel values in a luminance component of the reference frame;
means for applying a first spatial noise filter to the motion image to obtain a final motion image, comprising
means for applying the first spatial noise filter to the motion image to obtain a spatially filtered motion image;
means for subsampling the spatially filtered motion image by a ratio $r^2$, wherein r is the subsampled ration, and wherein applying the first spatial noise filter to each of the subsampled images obtains $r^2$ spatially filtered subsampled images; and
means for combining the $r^2$ spatially filtered subsampled images by reversing the subsampling to obtain the final motion image;
means for computing a blending factor image for the frame, wherein the blending factor image comprises a blending factor for each pixel in the frame, and wherein the blending factors are computed based on corresponding motion values in the final motion image; and
means for generating a filtered frame, wherein the blending factors are applied to corresponding pixel values in the reference frame and the frame.

10. The digital system of claim 9, wherein a value of the ratio r is one selected from a group consisting of 2 and 4.

11. The digital system of claim 9, further comprising:
means for applying a spatial noise filter to the frame prior to computing a motion image.

12. The digital system of claim 11, wherein the first spatial noise filter and the spatial noise filter are a same spatial noise filter.

13. The digital system of claim 9, further comprising:
means for downsampling the motion image prior to applying the first spatial noise filter; and
means for upsampling the final motion image by reversing the downsampling.

14. The digital system of claim 9, wherein the first spatial noise filter is an N×N spatial noise filter, wherein N is an integer.

15. The digital system of claim 14, wherein N=15.

16. The digital system of claim 9, wherein the frame is a Bayer frame.

\* \* \* \* \*